United States Patent Office 3,226,412
Patented Dec. 28, 1965

3,226,412
STABILIZATION OF ORGANIC ISOCYANATES
WITH DIPHENYL CARBAZIDE
Eric Smith, New Haven, Conn., assignor to Olin Mathieson Chemical Corporation, a corporation of Virginia
No Drawing. Filed Mar. 20, 1963, Ser. No. 266,479
6 Claims. (Cl. 260—453)

This invention relates to organic isocyanate compounds stabilized against discoloring, and to the process for preparing them.

Organic isocyanates have been used extensively as a reactant in processes for the preparation of polyurethane surface coatings and the like. One problem encountered in such processes is that organic isocyanates, such as toluene diisocyanate, become discolored when stored for extended periods prior to use. The normally colorless isocyanate develops a deep yellow color after extended storage periods. One reason that such discolored organic isocyanates are undesirable is because they impart an undesirable yellow color to the resulting polyurethane surface coating. Various additives have been employed to stabilize the organic isocyanates against discoloring. However, in general, these additives are either too expensive because large proportions of the additives are required to effect the desired degree of stabilization, or else the additives are not effective for extended periods of storage.

It is a primary object of this invention to provide organic isocyanate compositions stabilized against discoloring.

Another object of the invention is to provide toluene diisocyanate compositions stabilized against discoloring.

A further object of the invention is to provide a process for stabilizing organic isocyanates against discoloring.

It is another object of the invention to provide a process for stabilizing toluene diisocyanate against discoloring.

These and other objects of the invention which overcome the disadvantages of the prior art will be apparent from the following detailed description of the invention.

It has now been discovered that the aforesaid objects can be accomplished when an organic isocyanate is admixed with a stabilizing proportion of diphenyl carbazide.

Other carbazide compounds which may also be suitable include aromatic carbazides such as ditolylcarbazide, di(para-nitrophenyl) carbazide, di(para-chlorophenyl) carbazide, dinaphthyl carbazide, di(biphenylyl) carbazide and the corresponding aryl-substituted semicarbazides. Alkyl carbazides such as dimethyl carbazide, dilauryl carbazide and other alkyl-substituted carbazides in which the alkyl radical contains between about 1 and about 20 carbon atoms may be employed. The corresponding alkyl-substituted semicarbazides and thio-semicarbazides may also be employed. Thio-semicarbazide is also suitable for use as a stabilizer.

The stabilizing proportion of diphenyl carbazide is generally between about 10 and 2000 parts, and preferably between about 25 and about 1500 parts per million by weight of the organic isocyanate. However, any proportion of the diphenyl carbazide capable of effecting stabilization without adversely diluting the organic stabilizer may be employed.

Solid diphenyl carbazide is generally soluble in organic isocyanates and can be readily admixed with liquid organic isocyanate simply by agitating the stabilizing proportion of the solid in the organic isocyanate. When the organic isocyanate is a solid, it is heated to effect melting thereof and then admixed with the solid diphenyl carbazide until the stabilizer is dissolved.

Typical examples of organic isocyanates which can be stabilized in accordance with the technique of this invention include 2,4-toluene diisocyanate, 2,6-toluene diisocyanate, 4,4'-methylenediphenylisocyanate, 4,4'-methylenediortho - tolylisocyanate, 2,4,4'-triisocyanatodiphenylether, toluene-2,4,6-triisocyanate, 1-methoxy-2,4,6-benzenetriisocyanate, meta-phenylenediisocyanate, 4-chloro-meta-phenylenediisocyanate, 4,4'-biphenyldiisocyanate, 1,5-naphthalenediisocyanate, 1,4-tetramethylenediisocyanate, 1,6-hexamethylenediisocyanate, 1,10 - decamethylenediisocyanate, 1,4-cyclohexanediisocyanate, 4,4'-methylene-bis(cyclohexylisocyanate), 1,5-tetrahydronaphthalenediisocyanate, ortho-, meta- or para-tolueneisocyanate, alpha and beta-naphthyleneisocyanate, 4-methoxy-meta-phenylenediisocyanate, and the like.

Organic isocyanate stabilized in accordance with the technique of this invention can be stored for several months without appreciable discoloring.

The following examples are presented to further illustrate the invention without any intention of being limited thereby. All parts and percentages are by weight unless otherwise specified.

Examples I–II

Three vials having a capacity of 16 milliliters each were employed in carrying out these examples. The vials were cleaned, dried and the screw caps were lined with aluminum foil. Each vial was filled with 10 milliliters (12.2 grams) of colorless toluene diisocyanate which contained 80 percent 2,4-toluene diisocyanate and 20 percent 2,6-toluene diisocyanate. To each of two vials was added one carbazide stabilizer compound in the proportion indicated below in the table. No carbazide was added to the third vial. After securing the caps to the vials they were allowed to stand at room temperature for the period indicated in the table. The table also sets forth the color of the sample obtained after storage.

| Example | Stabilizer | Proportion Of Stabilizer, Grams | Storage Period, Days | Appearance After Storage Period |
|---|---|---|---|---|
| I | Diphenyl carbazide | 0.0162 | 28 | Colorless. |
| II | Thio-semicarbazide | 0.0126 | 28 | Slightly discolored. |

For purposes of comparison, the third vial to which no carbazide stabilizer had been added was discolored with a yellow color after standing 2½ days.

Examples III–IV

To determine the effectiveness of substituting hydrazine as a stabilizer for toluene diisocyanate in the presence of fluorescent light, two samples of toluene diisocyanate containing diphenyl carbazide were stored in 8-ounce clear bottles under fluorescent light at a distance of about 8 feet from the light source for a period of about 80 days. The bottles were shielded against sunlight so that the effect of the fluorescent light could be established. In Example III, the concentration of diphenyl carbazide was 50 parts per million and in Example IV the concentration of diphenyl carbazide was 400 parts per million.

After storing the samples for about 80 days, the color was determined in accordance with the procedure set forth in ASTM D1638–61T wherein the color is compared with various concentrations of aqueous solutions of potassium chloroplatinate. In this method aqueous solutions of various concentrations of a standard solution prepared from potassium chloroplatinate, hydrochloric acid, cobaltous chloride, and water are prepared, the lower number representing the lower concentration of the standard solution. The sample to be measured is then compared with the various standard solutions. Both bottles which contained diphenyl carbazide had a color number of about 25. For purposes of comparison a control sample which contained no diphenyl carbazide was stored under the same conditions and was found to have a color number of about 45.

Various modifications of the invention may be employed without departing from the spirit of the invention.

I claim:

1. An organic isocyanate containing a stabilizing proportion of diphenyl carbazide.

2. The composition of claim 1 wherein the stabilizing proportion of diphenyl carbazide is between about 10 and about 2000 parts per million by weight.

3. The composition of claim 1 wherein the stabilizing proportion of diphenyl carbazide is between about 25 and about 1500 parts per million by weight.

4. Toluene diisocyanate stabilized against discoloring comprised of toluene diisocyanate containing a stabilizing proportion of diphenyl carbazide.

5. Toluene diisocyanate stabilized against discoloring comprised of toluene diisocyanate containing between about 10 and about 2000 parts per million by weight of diphenyl carbazide.

6. Toluene diisocyanate stabilized against discoloring comprised of toluene diisocyanate containing between about 25 and about 1500 parts per million by weight of diphenyl carbazide.

No references cited.

CHARLES B. PARKER, *Primary Examiner.*